US008235671B2

(12) United States Patent
Yarbrough

(10) Patent No.: US 8,235,671 B2
(45) Date of Patent: Aug. 7, 2012

(54) WIND TURBINE BLADE SHEAR WEB CONNECTION ASSEMBLY

(75) Inventor: Aaron Yarbrough, Clemson, SC (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 13/185,682

(22) Filed: Jul. 19, 2011

(65) Prior Publication Data

US 2012/0027613 A1 Feb. 2, 2012

(51) Int. Cl.
F03D 11/00 (2006.01)

(52) U.S. Cl. .................................. 416/226; 416/241 R

(58) Field of Classification Search ............... 416/226, 416/241 R; 156/293; 403/404
See application file for complete search history.

(56) References Cited

U.S. PATENT DOCUMENTS

| | | | |
|---|---|---|---|
| 2,503,450 A | 4/1950 | Nebesar | |
| 3,771,748 A | 11/1973 | Jones | |
| 4,643,646 A | 2/1987 | Hahn et al. | |
| 5,476,704 A * | 12/1995 | Kohler | 428/119 |
| 6,234,423 B1 | 5/2001 | Hirahara et al. | |
| 6,513,757 B1 | 2/2003 | Amaoka et al. | |
| 6,520,706 B1 * | 2/2003 | McKague et al. | 403/265 |
| 6,800,956 B2 | 10/2004 | Bartlett | |
| 6,964,723 B2 | 11/2005 | Lindsay et al. | |
| 7,037,568 B1 | 5/2006 | Rogers et al. | |
| 7,179,059 B2 | 2/2007 | Sorensen et al. | |
| 7,244,487 B2 | 7/2007 | Brantley et al. | |
| 7,258,828 B2 | 8/2007 | Fish | |
| 7,371,304 B2 * | 5/2008 | Christman et al. | 156/293 |
| 7,393,488 B2 | 7/2008 | Grose et al. | |
| 7,625,623 B2 * | 12/2009 | Grose et al. | 428/119 |
| 7,810,757 B2 * | 10/2010 | Kirkwood et al. | 244/123.1 |
| 7,841,835 B2 * | 11/2010 | Bagepalli et al. | 416/226 |
| 7,897,095 B2 * | 3/2011 | Raeckers | 264/510 |
| 8,075,275 B2 * | 12/2011 | Althoff et al. | 416/226 |
| 2003/0037867 A1 | 2/2003 | Bersuch et al. | |
| 2006/0225278 A1 | 10/2006 | Lin et al. | |
| 2007/0036659 A1 | 2/2007 | Hibbard | |
| 2007/0110584 A1 | 5/2007 | Stommel | |
| 2009/0087318 A1 | 4/2009 | Althoff et al. | |
| 2010/0135815 A1 | 6/2010 | Bagepalli et al. | |
| 2010/0135817 A1 | 6/2010 | Wirt et al. | |
| 2010/0143143 A1 * | 6/2010 | Judge | 416/226 |
| 2010/0162567 A1 | 7/2010 | Kirkwood et al. | |
| 2011/0008175 A1 | 1/2011 | Gau | |
| 2011/0081247 A1 | 4/2011 | Hibbard | |
| 2011/0142663 A1 | 6/2011 | Gill | |
| 2011/0176928 A1 | 7/2011 | Jensen | |
| 2012/0027610 A1 | 2/2012 | Yarbrough | |
| 2012/0027612 A1 | 2/2012 | Yarbrough | |
| 2012/0027614 A1 | 2/2012 | Yarbrough | |
| 2012/0027615 A1 | 2/2012 | Irizarry-Rosado et al. | |

FOREIGN PATENT DOCUMENTS

WO  WO 2009/155920 A1  12/2009

* cited by examiner

*Primary Examiner* — Ninh H Nguyen
(74) *Attorney, Agent, or Firm* — Dority & Manning, P.A.

(57) ABSTRACT

A wind turbine blade has upper and lower shell members with a respective spar cap configured on an internal face of the shell members. A shear web extends between the spar caps along a longitudinal length of the blade. A connection assembly is configured between the transverse ends of the shear web and the spar caps and includes a channel structure configured on the spar cap. The channel structure includes rigid side walls that extend from the spar cap along the longitudinal sides of the shear web. Bond paste is disposed between the channel structure side walls and the longitudinal sides of the shear web.

7 Claims, 4 Drawing Sheets

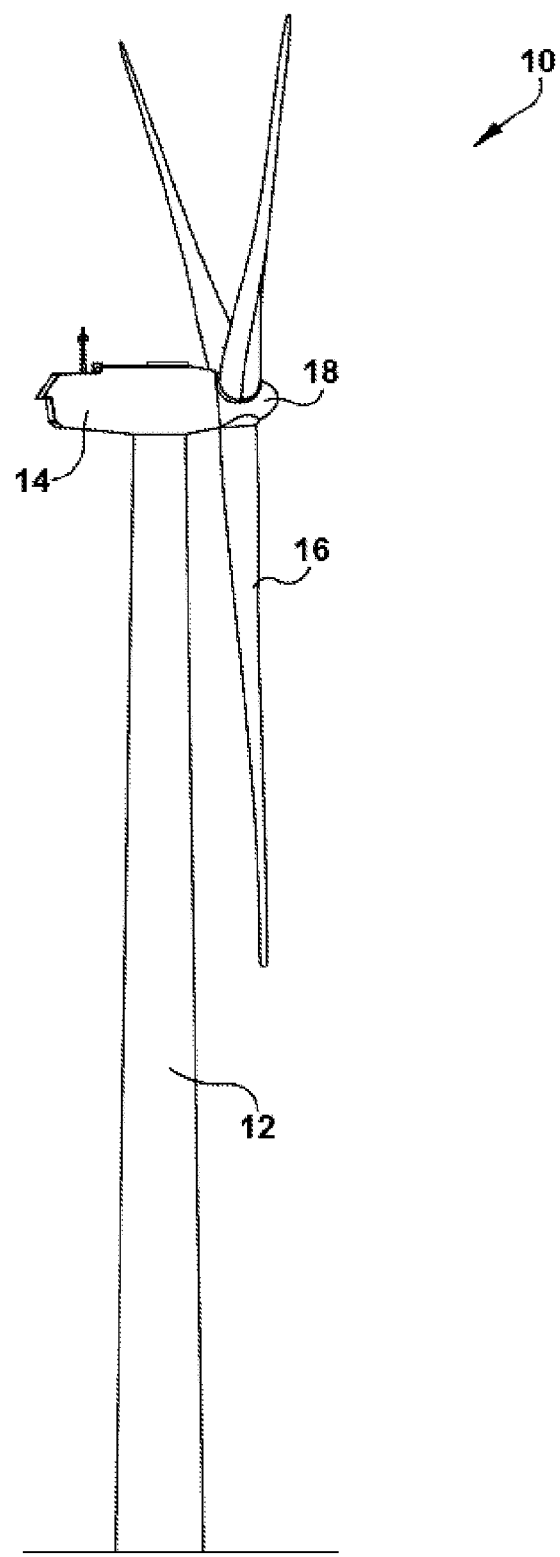
Fig. -1-
Prior Art

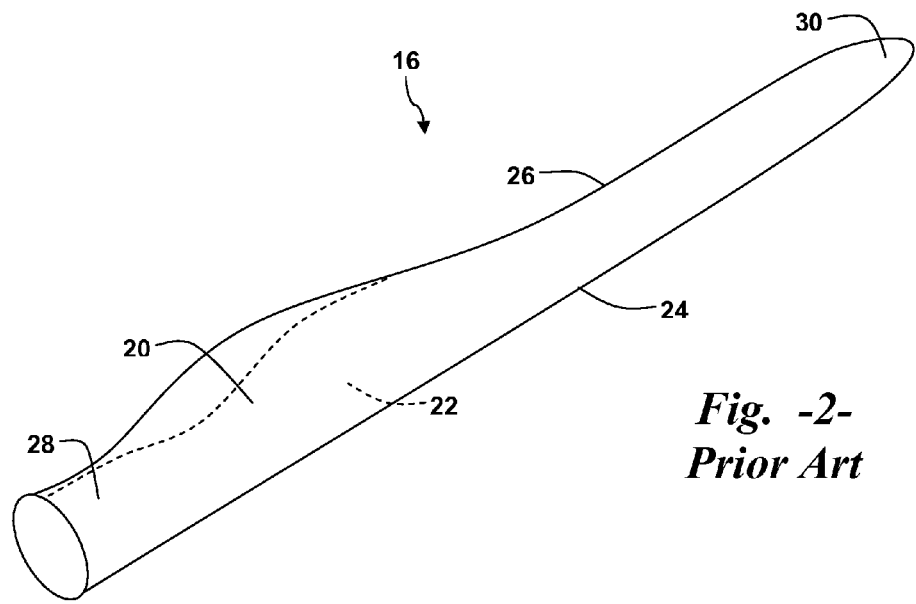
Fig. -2-
Prior Art
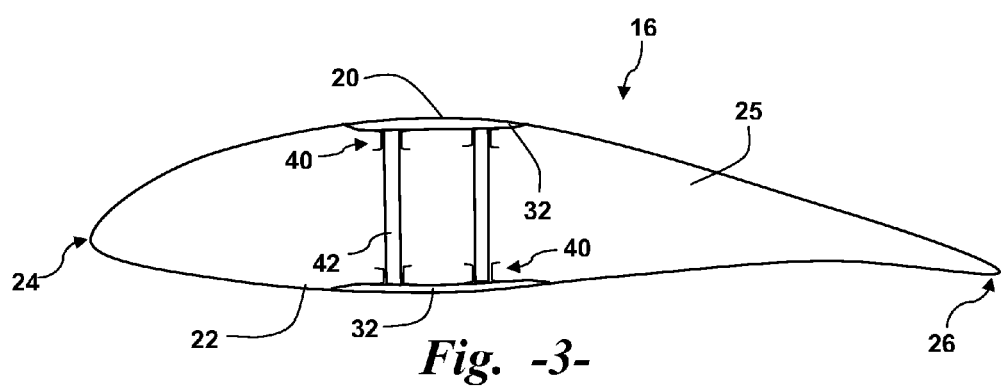
Fig. -3-

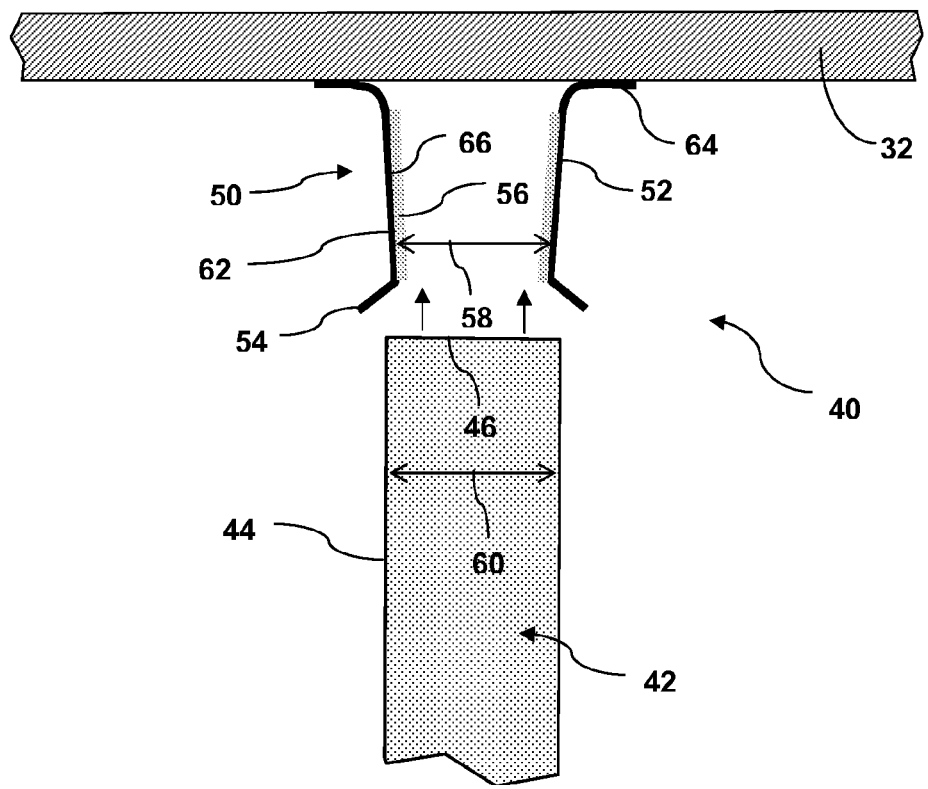
Fig. -4-
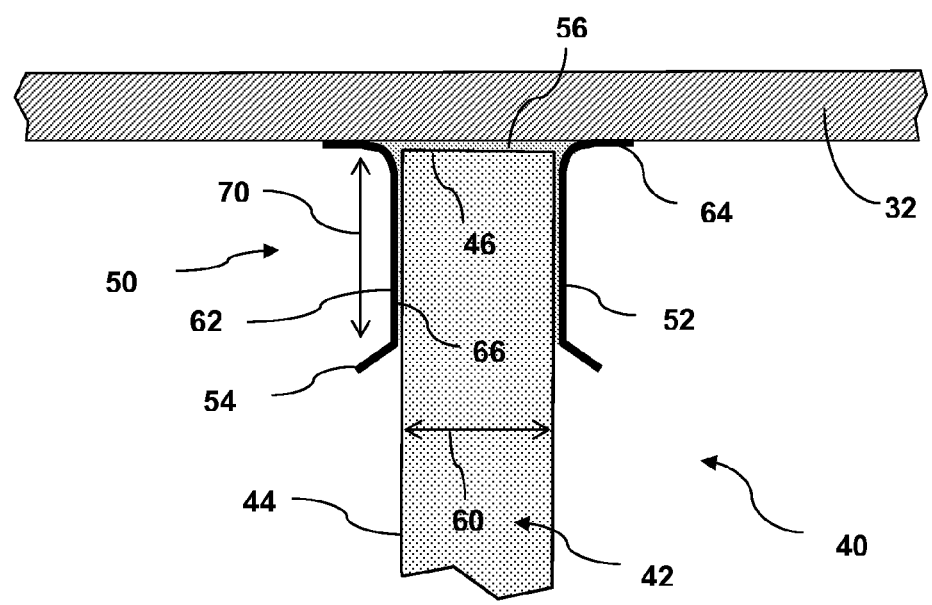
Fig. -5-

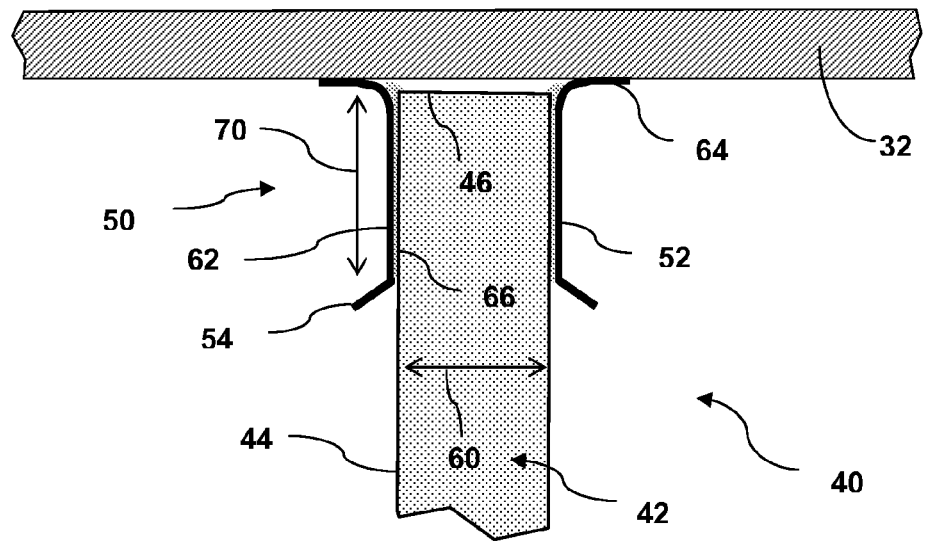
Fig. -6-
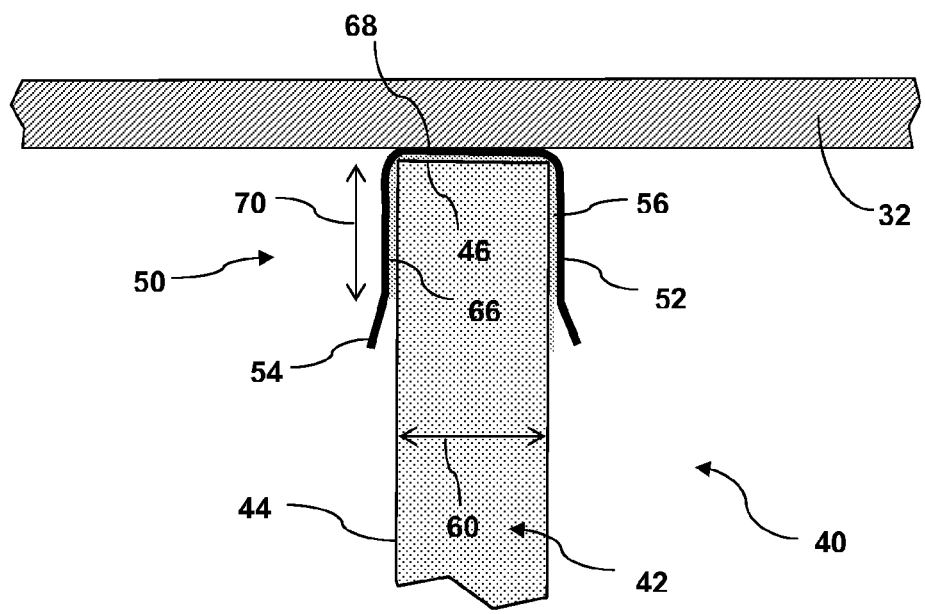
Fig. -7-

WIND TURBINE BLADE SHEAR WEB CONNECTION ASSEMBLY

FIELD OF THE INVENTION

The present invention relates generally to the field of wind turbines, and more particularly to the shear web configuration within the wind turbine blades.

BACKGROUND OF THE INVENTION

Turbine blades are the primary elements of wind turbines for converting wind energy into electrical energy. The blades have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

The turbine blades typically consist of a suction side shell and a pressure side shell that are bonded together at bond lines along the trailing and leading edges of the blade. An internal shear web extends between the pressure and suction side shell members and is bonded to spar caps affixed to the inner faces of the shell members. Relatively exact length dimensions are required for the spar web to span between the spar caps and achieve a bond between the spar cap and shear web having sufficient width and thickness dimensions. Achieving these dimensions, as well as an adequate bond, can be difficult and the juncture between the spar caps and shear web is a time-consuming and tedious process that often requires significant re-work.

With typical blade constructions, a rigid flange is used to achieve the desired bond width for bond paste applied between the spar caps and transverse ends of the shear web. This configuration, however, does not accommodate relatively large length variances (e.g., shortages) in the shear web and often results in the use of excess bond paste to make up for a length deviation and to achieve the bond width. The excess paste contributes unnecessary weight to the blade and can break off and result in blade "rattling" during operation of the wind turbine (a not uncommon complaint from wind turbine owners/operators). Also, air voids and unpredictable squeeze-out of the bond paste in the typical construction can result in areas of decreased bond strength, which is particularly problematic in sections of the blade where repair is not possible from within the blade.

Accordingly, the industry would benefit from an improved bond configuration between the shear web and spar caps that addresses one or more of the deficiencies of certain conventional configurations.

BRIEF DESCRIPTION OF THE INVENTION

Aspects and advantages of the invention will be set forth in part in the following description, or may be obvious from the description, or may be learned through practice of the invention.

In accordance with aspects of the invention, a wind turbine blade includes an upper shell member having a spar cap configured on an internal face thereof, and a lower shell member having a spar cap configured on an internal face thereof. A shear web extends between the spar caps along a longitudinal length of the blade. A connection assembly is provided between transverse ends of the shear web and the spar caps and includes a channel structure affixed to the spar cap by any suitable means. The channel structure has rigid side walls that extend from the spar cap along longitudinal sides of the shear web. Bond paste is disposed between the channel structure side walls and the longitudinal sides of the shear web. Thus, an effective bond length is created between the shear web and channel structure that is proportional to the length of the bond between each of the side walls and the side of the shear web. In a particular embodiment, the length of the bond along each of the side walls may be greater than the width of the transverse end of the shear web, thereby producing a substantially greater total bond strength.

Another benefit of the channel structure configuration is that the excess bond paste that typically "squeezes out" during the bonding procedure is now more controlled. A large concern arises when the bond paste is allowed to squeeze out freely, whereby it forms an irregular shape that acts as a stress concentration. By controlling the shape of the bond paste with the channel configuration, the stress concentration factor is effectively reduced.

The channel structure may be variously configured. In one embodiment, the side walls are spaced apart less than a width of the shear web and are flexed outwardly for insertion of the shear web into the channel structure. The side walls may include a flared end to accommodate flexing and receipt of the shear web.

In still a further embodiment, the channel structure may be a multi-component assembly. For example, each of the channel structure side walls may be separate components that are individually attached to the spar cap. In this type of embodiment, the channel structure side walls may be configured as flange members bonded to said spar cap so as to extend transversely therefrom.

In an alternate embodiment, the channel structure may be a single, unitary component, for example a U-shaped component, and include an end wall extending between the side walls, with the end wall affixed to the spar cap.

The transverse end of the shear web may be variously received within the channel structure. In one embodiment, the transverse end may be spaced from the spar cap (or end wall of the channel structure). The space between the transverse end of the shear web and the spar cap may be free of bond material so as to decrease the overall amount and weight of the bond paste. In other embodiments, it may be desired to bond the transverse end of the shear web to the spar cap (or end wall of the channel structure) by essentially encasing the transverse end of the shear web with bond paste within the channel structure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art is set forth in the specification, which makes reference to the appended figures, in which:

FIG. 1 is a perspective view of a conventional wind turbine;

FIG. 2 is a perspective view of a conventional wind turbine blade;

FIG. 3 is a cross-sectional view of an exemplary wind turbine blade incorporating aspects of the invention;

FIG. 4 is an enlarged cross-sectional component view of a connection assembly between a shear web and spar cap in accordance with an embodiment of the invention;

FIG. 5 is an enlarged cross-sectional view of the embodiment of FIG. 4; in an assembled state;

FIG. 6 is an enlarged cross-sectional component view of an alternate embodiment of a connection assembly; and, FIG. 7 is an enlarged cross-sectional component view of still another embodiment of a connection assembly.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of turbine blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

FIG. 2 is a more detailed view of a wind turbine blade 16. The blade 16 includes an upper shell member 20 and a lower shell member 22. The upper shell member 20 may be configured as the suction side surface of the blade 16, while the lower shell member 22 may be configured as the pressure side surface of the blade. The blade 16 includes a leading edge 24 and a trailing edge 26, as well as a root portion 28, and a tip portion 30. As is well known in the art, the upper shell member 20, and lower shell member 22 are joined together at the leading edge 24 and trailing edge 26. The blade 16 includes an internal cavity 25 (FIG. 3) in which various structural members, such as spar caps and one or more shear webs, are configured.

FIG. 3 is a cross-sectional view of a wind turbine blade 16 that incorporates aspects of the invention. The blade 16 includes one or more internal structural shear webs 42 that span between the upper 20 and lower shell members 22. In particular, the shear webs 42 span between structural spar caps 32 that are fixed to the internal faces of the shell members 20, 22. In accordance with aspects of the invention, an improved connection assembly 40 is provided at the interface of the shear webs 42 and spar caps 32, as described in greater detail below.

FIGS. 4 and 5 depict an embodiment of a connection assembly 40 between transverse ends 46 of the shear web 42 and the spar caps 42. The connection assembly 40 includes a channel structure 50 configured on the spar cap 32. The channel structure 50 has rigid side walls 52 that extend transversely from the spar cap 32 along longitudinal sides 44 of the shear web 42. Bond paste 56 is disposed between the channel structure side walls 52 and the shear web sides 44 of the shear web. The bond paste 56 may be applied as a continuous or discontinuous layer between the members, and in any amount to achieve a desired bond paste thickness.

Upon insertion of the transverse end 46 of the shear web 42 into the channel structure 50, an effective bond length 70 is created between the shear web and a respective one of the side walls 52. The total bond between the shear web 42 and spar cap 32 is thus proportional to the combined length of the bonds 70 between each of the side walls 52 and the side of the shear web sides 44. In the embodiment of FIGS. 4 and 5, the length 70 of the bond along each of the side walls 52 is greater than the width 60 of the transverse end 46 of the shear web, thereby producing a substantially greater total bond strength as compared to a bond layer between the transverse end 46 and spar cap 32.

The channel structure 50 may be variously configured. For example, in the embodiment of FIGS. 4 and 5, the rigid side walls 52 are spaced apart with a width 58 that is less than the shear web width 60 (at least at the open receiving end of the channel structure 50). In this configuration, the side walls 52 flex outwardly for insertion of the shear web 42 into the channel structure, as in evident from the view of FIG. 5. Thus, a positive engagement of the side walls 52 against the shear web sides 44 is provided. The side walls 52 may include a flared receiving end 54 to accommodate flexing and receipt of the shear web 42.

The channel structure 50 may be a multi-component assembly, as depicted in the embodiments of FIGS. 4 through 6. For example, each of the channel structure side walls 52 may be separate components that are individually affixed to the spar cap 32. In the illustrated embodiment, the channel structure side walls 52 are configured as individual flange members 62 having an attachment leg 64 affixed to the spar cap 32 by suitable means, such as bonding, mechanical fasteners, and so forth. The flange members 62 include a bond face 66 that extends transversely from the spar cap 32 along the shear web sides 44.

In the embodiment of FIG. 7, the channel structure 50 is a single, unitary component, for example a U-shaped channel component, and includes an end wall 68 that extends between the side walls 52. The end wall 68 is affixed to the spar cap 32 by any suitable means. The U-shaped channel component thus forms a cradle for receipt of the transverse end 46 of the shear web 42.

The transverse end 46 of the shear web 42 may be variously received within the channel structure 50. In the illustrated embodiments, the transverse end 46 is spaced from the spar cap 32 (or end wall 68 of the channel structure 50). The space between the transverse end 46 and the spar cap 32 may be free of bond material, as depicted in FIG. 6, so as to decrease the overall amount and weight of the bond paste. In other embodiments, as depicted in FIGS. 5 and 7, the space may be filled with bond paste 56 such that the transverse end 46 of the shear web 42 is essentially encased in bond material within the channel structure 50.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A wind turbine blade, comprising:
   an upper shell member having a spar cap configured on an internal face thereof;
   a lower shell member having a spar cap configured on an internal face thereof;
   a shear web extending between said spar caps along a longitudinal length of said blade;
   a connection assembly between transverse ends of said shear web and said spar caps, said connection assembly further comprising:
      a U-shaped channel structure configured on said spar cap, said channel structure comprising rigid side walls that extend from said spar cap so as to extend along longitudinal sides of said shear web;
      said channel structure comprising an end wall extending between said channel structure side walls, said end wall bonded to said spar cap; and,
      bond paste disposed between said channel structure side walls and said longitudinal sides of said shear web.

2. The wind turbine blade of claim 1, wherein said channel structure side walls are spaced apart less than a width of said shear web and are flexed outwardly for insertion of said shear web into said channel structure.

3. The wind turbine blade of claim 1, wherein said transverse end of said shear web is spaced from said spar cap.

4. The wind turbine blade of claim 3, wherein said transverse end of said shear web is unbonded to said spar cap.

5. The wind turbine blade of claim 3, wherein said transverse end of said shear web is encased in bond paste within said channel structure.

6. The wind turbine blade of claim 1, wherein each said side wall of said channel structure forms a bond with said longitudinal side wall of said shear web having a length that is greater than a width of said transverse end of said shear web.

7. A wind turbine blade, comprising:
   an upper shell member having a spar cap configured on an internal face thereof;
   a lower shell member having a spar cap configured on an internal face thereof;
   a shear web extending between said spar caps along a longitudinal length of said blade;
   a connection assembly between transverse ends of said shear web and said spar caps, said connection assembly further comprising:
      a U-shaped channel structure configured on said spar cap, said channel structure comprising rigid side walls that extend from said spar cap so as to extend along longitudinal sides of said shear web, said side walls spaced apart less than a width of said shear web and are flexed outwardly for insertion of said shear web into said channel structure;
      said channel structure comprising an end wall extending between said channel structure side walls, said end wall bonded to said spar cap; and,
      bond paste disposed between said channel structure side walls and said longitudinal sides of said shear web forming a bond between each said side wall and said longitudinal side wall of said shear web having a length that is greater than a width of said transverse end of said shear web.

* * * * *